Sept. 15, 1936.   C. WANTZ   2,054,349
SEALING CONNECTION
Filed March 7, 1935

INVENTOR
Clarence Wantz
BY
Bottum, Hudnall, Lecher, McNamara + Michael
ATTORNEY

Patented Sept. 15, 1936

2,054,349

UNITED STATES PATENT OFFICE 2,054,349

SEALING CONNECTION

Clarence Wantz, Milwaukee, Wis., assignor to Milwaukee Gas Specialty Company, Milwaukee, Wis., a corporation of Wisconsin Application March 7, 1935, Serial No. 9,717

10 Claims. (Cl. 284—14)

This invention relates to a coupling or sealing connection for parts which are mechanically engaged and disengaged by relative rotary movement, as, for example, parts which are mechanically interconnected by means of threaded members.

One of the objects of the invention is to provide a coupling or sealing connection of this character which not only affords a secure mechanical interconnection and an hermetic seal but which employs a sealing element of such character and in such manner that it can take the turning and pressing action of the threaded part with which it is engaged without having its capacity for repeated use impaired. More particularly the sealing or packing element against which one of the turning parts presses and rotates is of such elasticity and plasticity and has its action so controlled that when a sealing connection is effected it will have taken a shiny finish and also a contour corresponding to that of the part with which it has sealing engagement.

Another object is to accomplish these purposes in a construction which is in general simple in its nature, durable in use, readily and conveniently manipulated to engage and disengage the parts and easy and comparatively inexpensive to manufacture.

Figure 1:
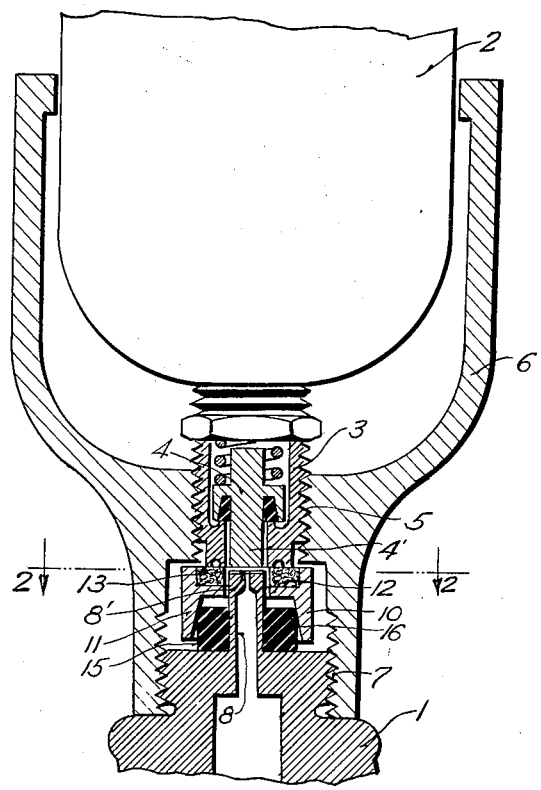
Figure 2:
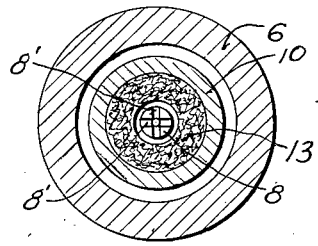

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a fragmentary view partly in side elevation and partly in transverse vertical section showing one construction in which the invention may be advantageously embodied; and Figure 2 is a view in horizontal section taken on line 2—2 of Figure 1.

Referring to the drawing, the numeral 1 designates one of the parts and the numeral 2 the other part which are to be coupled together by means affording a sealed connection therebetween. The invention is applicable to parts of any character designed to be so interconnected and sealed where the engagement and disengagement thereof is effected by a relative rotary movement therebetween.

In the present instance, and for the sake of illustration only, part 1 is illustrated as a portion of a fitting adapted to be connected with the tap rod of a beer tap and part 2 illustrates a portion of a holder or cartridge for carbon dioxide gas.

The holder 2 has an externally threaded discharge nipple 3 equipped with a spring closed discharge valve 4. The nipple 3 is threaded into an internally threaded opening 5 provided therefor in a connecting and guard member 6, one end of which guard member is threadedly connected to the fitting 1, as indicated at 7, and the other end of which telescopes over the holder 2. The fitting 1 has a valve trip pin 8, preferably in the form of a tubular projection. When the parts are assembled the upper end of the pin 8 is designed to engage the stem 4' of the valve 4 and lift the valve off its seat. It will be noted that the upper end of the valve trip pin 8 has its axial opening reduced. This upper end also has cross notches or slots 8' so that the reduced aperture in its upper end will not be closed or sealed off when in engagement with the valve stem 4'.

For the purpose of constraining the gas which flows past the valve 4 to pass through the valve pin 8 and into the fitting 1 a sealing washer assembly and retaining means therefor is provided and comprises a double retaining cup designated generally at 10 and having a generally cylindrical body 11 provided with an internal partition 12 intermediate its ends, which partition 12 is apertured to fit over the pin or tubular projection 8. In the upwardly opening recess provided by the cup above the partition 12 an annular sealing or packing washer 13 is provided. This washer 13 is so constituted as to have a limited plasticity as well as elasticity so that when the lower end of the nipple 3 presses and turns thereagainst the surface of the washer engaged with nipple will take on a shiny finish and also a contour corresponding to that of the lower end of the nipple or at least to such extent as to effect proper sealing engagement between itself and the nipple. Scuffing or roughening up of the washer 13 under the influence of the turning movement of the nipple 3 and of the pressure which the nipple exerts against the washer is avoided. The washer 13 may be of any suitable composition which will develop these desirable properties. One such composition is made up of asbestos and a suitable binder pressed in sheet form.

In the recess in the cup 10 below the partition 12 an annular rubber washer 15 is provided. This annular rubber washer fits over the tubular projection 8 and has its outer periphery engaged by the beveled inner wall 16 of the cup 10.

With this arrangement, when the holder 2 is turned to thread the nipple 3 down through its opening 5 the lower end of the nipple comes into engagement with the upper surface of the packing element or washer 13 and presses and turns thereagainst so as to bring about sealing engagement between the lower end of the nipple and the washer 13 and also sealing engagement between the cup 10 and the washer 15 and between the washer 15 and the tubular projection 8, the cup or retainer 10 being forced down along the projection or trip pin 8 to effect suitable compression of the lower washer 15. The sealing engagement just mentioned is made prior to the opening of the valve 4, the lower washer 15 being thereafter further compressible to allow the pin 8 to engage the stem 4' and open the valve without in any way disturbing the seals as previously made. In this way the connection between the parts is hermetically sealed so that the gas is constrained to flow from the nipple 3 through the trip pin 8 into the fitting 1. The engagement of the parts as well as the making and breaking of the seal is effected merely by turning the holder 2.

While I have shown and described one construction in which the invention may be advantageously embodied, it is to be understood that this construction has been selected merely for the sake of illustration or example, and that various changes in the size, shape and arrangement of the parts may be made without departing from the spirit of the invention or the scope of the subjoined claims.

The invention claimed is:

1. A sealing connection for parts engaged and disengaged by relative rotary movement and adapted when drawn together to release a valve carried by one of said parts and comprising a packing element of limited plasticity and elasticity, a retainer for said packing element mounted on one of said parts and presenting a surface of said packing element to the other of said parts whereby as the parts are brought together the part to which the surface of the packing element is presented will work against said surface and develop a shiny finish thereon and a contour therein corresponding to the contour of said last-named part so as to effect sealing engagement without impairing said packing elements capacity for repeated future use, and a rubber washer between said retainer and said part upon which said retainer is mounted, said washer being compressible to form a seal between said retainer and said last mentioned part and further compressible to permit said parts to draw together to release said valve.

2. A sealing connection for threadedly interconnected parts, one of which has a nipple threaded into the other, said other having a tubular projection with which said nipple is to have a sealed connection, a cup-like retainer mounted on said tubular projection and packing in said retainer and presenting a surface to said nipple, said packing having limited elasticity and plasticity so that when engaged and pressed by said nipple it will develop a shiny finish and a contour corresponding to that of the nipple as it is brought into sealing engagement therewith, and a compressible rubber washer between said retainer and said projection, said washer permitting said parts to draw further together after sealing engagement is established between said parts.

3. A sealing connection for threadedly interconnected parts, one of which has a nipple threaded into the other, said other having a tubular projection with which said nipple is to have a sealed connection, a cup-like retainer mounted on said tubular projection and packing in said retainer and presenting a surface to said nipple, said packing having limited elasticity and plasticity so that when engaged and pressed by said nipple it will develop a shiny finish and a contour corresponding to that of the nipple as it is brought into sealing engagement therewith, in combination with means for effecting a sealed connection between the retainer and the tubular projection, said means permitting said parts to be drawn together and moved apart within defined limits without disturbing the sealing connection between said parts.

4. A sealing connection for threadedly interconnected parts, one of which has a nipple threaded into the other, said other having a tubular projection with which said nipple is to have a sealed connection, a cup-like retainer mounted on said tubular projection and packing in said retainer and presenting a surface to said nipple, said packing having limited elasticity and plasticity so that when engaged and pressed by said nipple it will develop a shiny finish and a contour corresponding to that of the nipple as it is brought into sealing engagement therewith, in combination with a rubber washer surrounding the projection and engaged by the retainer to be compressed into sealing engagement with the retainer and the projection when the nipple is threaded thereon, said washer permitting said parts to be drawn together and moved apart within defined limits without disturbing the sealing connection between said parts.

5. A sealing connection for threadedly interconnected parts including a nipple on one part and a tubular projection on the other opposed to said nipple, a cup having an opening through which the nipple projects, packing carried by said cup and engaged by the end of the nipple, the packing being so constituted as to develop a shiny finish and a contour corresponding to and adapted to have sealing engagement with said nipple, and compressible means for effecting sealing engagement between said cup and said projection said means being further compressible after a sealing connection has been established.

6. A sealing connection for threadedly interconnected parts including a nipple on one part and a tubular projection on the other opposed to said nipple, a retainer on said tubular projection having a recess, elastic packing in said recess disposed to be engaged by the nipple, said packing having a sufficient degree of plasticity to enable it when subjected to rotation and pressure by said nipple to develop a shiny finish and a contour corresponding to and having sealing engagement with the nipple, and compressible means providing a seal between the retainer and the projection, said means rotating as a unit with said projection and said retainer as said parts are advanced by relative rotation, said retainer being movable longitudinally on said projection.

7. A sealing connection for parts engaged and disengaged by relative rotary motion comprising a cup mounted on one of said parts and having a recess, packing in said recess positioned to be rotatively engaged by said other part, said packing being adapted to withstand the drag thereon and develop a shiny finish, and a contour corresponding to and designed for sealing engagement with the part rotating thereagainst, and means compressible under and responsive to the pressure exerted by said second mentioned part to effect a sealing connection between the cup and the other part, said means engaging said cup and said last mentioned part to cause said cup and said part to rotate as a unit.

8. In combination, a valve carrying member, a second member having a valve trip pin, said members being threadedly interconnected whereby relative rotation causes said members to be advanced together and said pin to open said valve, and a sealing connection interposed between said members and adapted to establish a seal therebetween prior to the opening of said valve and being compressible while maintaining said seal to permit further advancement of said parts to open said valve, said sealing connection comprising a compressible rubber washer encircling said pin, a cup engaging said washer and adapted to compress said washer toward said pin to form a seal between said pin, washer, and cup, said cup having a packing ring positioned to engage said valve carrying member, said packing ring being of limited elasticity and plasticity whereby said valve carrying member engages therewith and rotates thereagainst to form a sealing engagement therebetween while moving said cup longitudinally of said pin to compress said rubber washer.

9. A sealing connection for parts threadedly interconnected and relatively rotatable to draw said parts together, one of said parts containing a release valve and the other of said parts containing a trip pin engageable with said valve to release the same, comprising a compressible rubber washer adapted to move with one of said parts and form a seal therewith when compressed, a retaining cup for said washer, and a packing ring on said cup against which the other of said parts rotates and engages to form a seal therebetween, said cup rotating as a unit with said rubber washer and with said part with which said washer forms a seal, said washer being compressible after said seals are formed to permit said parts to draw further together to release said valve.

10. A sealing connection for two parts providing a fluid passageway and having surfaces relatively rotatable to draw together and move apart said parts within defined limits necessary to open and close a valve in one of said parts, comprising a compressible rubber washer and retaining cup rotatable as a unit with one of said surfaces and forming a continuous seal between said surface and said cup within said defined limits, and a packing ring carried by said cup and engaged by said other surface and having characteristics whereby said last named surface presses against, rotates on, and forms a continuous seal therewith within said defined limits, the engagement between said packing and said surface causing said cup as influenced by said washer to move longitudinally and without rotation relative thereto towards and away from said other surface as said parts are drawn together and moved apart.

CLARENCE WANTZ.